Jan. 13, 1970   J. G. TAUSENDFREUNDT   3,488,845
KNIFE BLADE WITH DOUBLE SERRATED EDGE
Filed Sept. 26, 1967
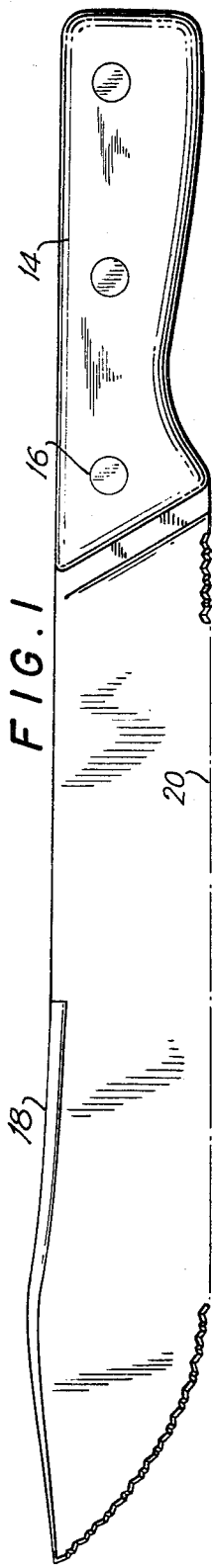
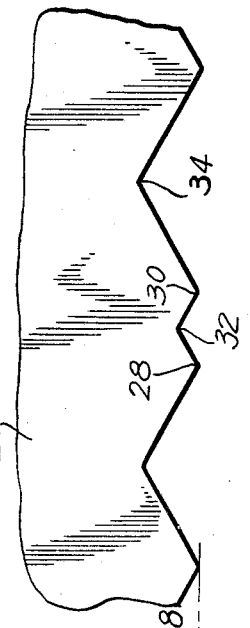
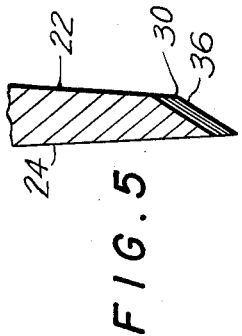
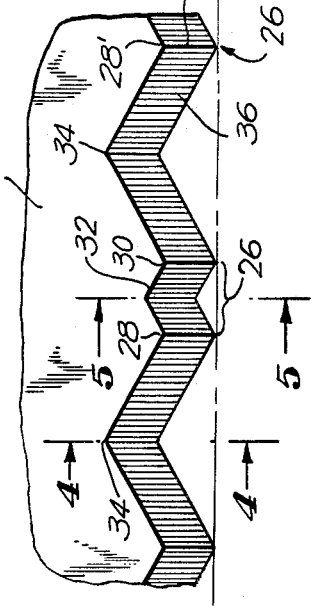
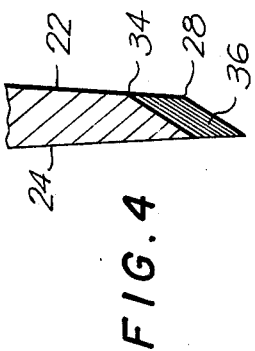
INVENTOR.
JAY G. TAUSENDFREUNDT
BY
ATTORNEY

United States Patent Office

3,488,845
Patented Jan. 13, 1970

---

3,488,845
KNIFE BLADE WITH DOUBLE SERRATED EDGE
Jay G. Tausendfreundt, Bristol Ferry, R.I., assignor to Imperial Knife Associated Companies, Inc., Providence, R.I., a corporation of Rhode Island
Filed Sept. 26, 1967, Ser. No. 670,659
Int. Cl. B26b 9/02
U.S. Cl. 30—355    4 Claims

ABSTRACT OF THE DISCLOSURE

A knife blade having a serrated cutting edge. The serrations on the edge are composed of widely spaced pairs of closely spaced V-shaped crests separated by V-shaped notches. The crests of any pair are separated from one another by a narrow shallow notch and each pair of crests is separated from the adjacent pair of crests of a broad deep notch. All of the crests lie on a smooth line. The flanks of all notches are at an acute angle to a face of the blade so as to form a sharp cutting edge running along the notches and crests.

---

BACKGROUND OF THE INVENTION

Field of the invention

A knife blade with a serrated edge composed of widely-spaced pairs of closely spaced crests.

Description of the prior art

The present invention is concerned with a knife blade that is to be employed for cutting; i.e., slicing, of foods. The food either may be raw or cooked. By way of example, such foods include raw meat, poultry, fish and vegetables and cooked meat, poultry, fish, vegetables, and baked goods, e.g., bread and cake. The blade may be used in all kinds of knives, such for instance as kitchen knives, carving knives, steak knives, vegetable knives, paring knives and table knives.

There has been a continuing effort to provide knife blades which have good cutting efficiency and preferably in which such cutting efficiency is imparted thereto by the longitudinal configuration of the cutting edge rather than the transverse configuration of said edge so that the cutting efficiency is maintained even when the knife blade is misused as by cutting against ultra-hard surfaces such as bone, metal, glass, china and the like. For example, the cutting efficiency of an every-day kitchen knife blade is about 1 on an arbitrary scale measured by a procedure which obtains consistent, reproducible results. In this measuring procedure rubber of specific thickness and durometer and having a specific abrasion factor is held under a specific tension. The blade whose cutting efficiency is to be measured is pressed against rubber with a specific pressure and the blade is drawn across the rubber for a specific distance. The depth to which the blade cuts into the rubber is a measure of the cutting efficiency of the blade. When this testing procedure is employed it will be found that the depth of cut is a direct function of the cutting efficiency of the blade in the field. In other words a knife blade which makes a deeper cut will be found to cut more easily in everyday use.

As noted above, an ordinary kitchen knife blade has a cutting efficiency of about 1 as measured by the foregoing test procedure. There are a wide variety of shapes of serrated cutting edges that have been proposed in order to improve cutting efficiency. What is believed to be among the best of these is the edge shown in U.S.L.P. 2,825,968 which consists of a uniform series of pointed cusps linked by short concave spans. Using the same test procedure such a knife blade has a cutting efficiency of about 1.75. More recently, a straight knife edge has been developed having an extremely, i.e., ultra-sharp, cutting edge formed by using a thin root and lapped flanks. This edge has a cutting ability as measured by said method of about 1.9.

SUMMARY OF INVENTION

According to the present invention a new shape of serrated edge is provided which drastically increases the cutting efficiency of a knife blade. The new edge has been found to have a cutting efficiency of about 2.5 by the aforesaid test procedure, an increase of about 40% over one of the best serrated cutting edges of the prior art.

Accordingly it is an object of this invention to provide a new shape of serrated edges for a knife blade which new shape will create a cutting efficiency very substantially in excess of the cutting efficiency of previous good serrated edges.

More specifically, it is an object of the present invention to provide a serrated cutting edge consisting of pairs of closely spaced crests which pairs are mutually, widely separated from one another, this being the configuration which has been found to yield the highly desirable, radically increased cutting efficiency of about 2.5.

Other objects of the invention in part will be obvious and in part will be pointed out hereinafter.

The invention accordingly consists in the features of construction, combinations of elements and arrangements of parts which will be exemplified in the cutting blade hereinafter described and of which the scope of application will be indicated in the appended claims.

BRIEF DESCRIPTION OF THE DRAWINGS

In the accompanying drawings, in which is shown one of the various possible embodiments of this invention, FIG. 1 is a plan view of a knife having a blade constructed in accordance with the instant invention;

FIG. 2 is an enlarged fragmentary view of the serrated edge of the blade as viewed from one face;

FIG. 3 is a view similar to FIG. 2 but showing the opposite face; and

FIGS. 4 and 5 are sectional views taken substantially along the lines 4—4 and 5—5, respectively, of FIG. 2.

DESCRIPTION OF THE PREFERRED EMBODIMENT

Referring now in detail to the drawings, the reference numeral 10 denotes a kitchen carving knife having a knife blade 12 embodying the instant invention. Said knife includes the usual handle 14 in which there is inserted a tang (not shown) of the knife blade 12, the tang being secured to the handle in a conventional fashion as by rivets 16. The blade is made of steel, preferably stainless steel; it is hardened and tempered to a residual hardness of about 55 to 61 Rockwell C.

The specific knife blade illustrated, to wit, the knife blade of a kitchen carving knift, is, as is usual in the art, quite long and broad and includes a blunt upper edge 18. The cutting edge 20 of the knife blade extends from near the handle towards and optionally, to the tip of the blade, and constitutes the bottom edge of the blade. The side faces 22, 24 of the knife blade taper downwardly toward the cutting edge. A suitable taper angle is about 12° to about 15°. The side faces may either be flat-ground to provide the taper or may be hollow-ground to attain the same effect of a reduction in thickness toward the cutting edge. The side faces do not meet at the cutting edge, an acutely inclined flank being ground onto one face of the lower edge of the blade for this purpose, as will be pointed out later.

The configuration of the cutting edge 20 is the sole novelty of the present invention. This configuration is such that the cutting edge 20 is composed of a series of repetitive pairs 26 of closely spaced V-shaped crests 28, 30. Although the crests 28, 30 in each pair 26 are spaced close to one another, the adjacent crests (e.g., 30, 28') of successive pairs are spaced apart widely. Thus, the all-over appearance of the cutting edge 20 is that of spaced groups of V-shaped crests with only two closely spaced V-shaped crests in each group.

Moreover, all of the crests lie on a smooth line (a part of which is denoted in dot-and-dash in FIG. 2) which for the major portion of the cutting edge is straight, this major portion being the portion running from the handle toward but not to the tip. The remaining portion of the smooth line extending to the tip sweeps upwardly in an outwardly convex curve.

The V-shaped crests 28, 30 of each pair 26 are separated by a narrow shallow V-shaped notch 32. The adjacent V-shaped crests (e.g., 30, 28') of successive groups of crests are separated from one another by a broad deep V-shaped notch 34.

Preferably, the center-to-center spacing of the apices of the broad deep V-shaped notches 34 is substantially uniform for the length of the cutting edge 20 and the depths of all of said notches 34 are substantially the same. Preferably also, the apices of the narrow shallow notches 32 are centered between the apices of the broad deep notches 34. Thereby the serrated edge has a pleasing regular appearance.

The angles of all of the crests 28, 30 and notches 32, 34 are from about 90 to about 150° in order to obtain the desired good cutting efficiency. The preferred angle for all these notches and the crests is 120°. It is not essential, although it is desirable, to use the same angles for the narrow shallow notches 32, for the broad deep notches 34 and for the V-shaped crests 28, 30.

To obtain the desired high cutting efficiency, it is important for certain dimensions to be employed for the spacings of the crests and notches. Specifically, the center-to-center spacing for the apices of the broad deep notches 34 is $3/16''\pm1/32''$. The ratio of the distance across the full width of a broad deep notch 34 to the distance across the full width of a narrow shallow notch 32 is in the order of from about 5:1 to 3:1. By way of example, assuming that the apex-to-apex spacing of two successive broad deep notches 34 is $3/16''$, then the distance across the full width of a broad deep notch 34 is $0.144''\pm0.010''$ and the apex-to-apex spacing between the crests 28, 30 of a pair of closely spaced crests 26 is $0.043''\pm0.010''$.

In the preferred form of the invention, all of the broad deep notches have the same depth as one another and all of the narrow shallow notches have the same depth as one another.

Each of the notches is so treated on one face of the blade, as for example, by grinding, as to form an acutely angled flank 36 whereby the lower edge 20 of the blade is acutely tapered in a chisel-like section (see FIGS. 4 and 5) to cutting sharpness. The angle of taper is $25°\pm5°$. Preferably the flanks 36 of the cutting edge are smoothed, after they have been formed to provide the sharpened cutting edge, so that any burrs or steel shreds that may be present on said edge are removed. The flanks of adjacent notches meet at the crests between them to define ridges 38 which run perpendicularly to the length of the knife blade.

I am unable to state why the foregoing unique configuration of cutting edge produces such a drastic increase in cutting efficiency; however I can say that the special shape and dimensions above set forth are critical. inasmuch as deviations therefrom substantially reduce cutting efficiency. Hence, it is essential in the practice of the invention that the recited criteria be observed, to wit, that the edge be "double-serrated," i.e., composed of widely spaced pairs of closely spaced V-shaped crests separated by V-shaped notches, the crests lying on a common smooth line, the crests having apex angles of from about 90° to about 150°, the spacing across the full width of a narrow shallow notch being about $1/3$ to $1/5$ of the spacing across the full width of a broad deep notch, and the spacing between the apices of notches between adjacent pairs of closely spaced crests being $3/16''\pm1/32''$.

It thus will be seen that there is provided a knife blade which achieves the various objects of this invention and is well adapted to meet the conditions of practical use.

As various possible embodiments might be made of the above invention and as various changes might be made in the embodiment above set forth, it is to be understood that all material herein described or shown in the accompanying drawing, is to be interpreted as illustrative and not in a limiting sense.

Having thus described the invention, there is claimed as new and desired to be secured by Letters Patent:

1. A tempered hard elongated steel knife blade having a sharp double-serrated cutting edge composed of a series of widely spaced repetitive pairs of colsely spaced V-shaped crests separated by V-shaped notches, the crests of each pair being separated from one another by a narrow shallow notch and each pair of crests being separated from the adjacent pair of crests by a broad deep notch, the flanks of each notch being at an acute angle to a face of the blade so as to form a sharp cutting edge running along the notches and crests, all of the crests lying in a smooth line, the crests having an angle of from about 90° to about 150°, the apex-to-apex distance of successive broad deep notches being $3/16''\pm1/32''$ and the ratio of the distance across the full width of a narrow shallow notch to the distance across the full width of a broad deep notch being from about $1/3$ to about $1/5$.

2. A knife blade as set forth in claim 1 wherein the apices of the crests have an angle of about 120°, wherein the distance between the closely-spaced crests of a pair of crests is $0.043''\pm0.010''$ and wherein the distance across the full width of a broad deep notch is $0.144''\pm0.010''$.

3. A knife blade as set forth in claim 1 wherein the angle between the flanks and the face of the blade is $25°\pm5°$.

4. A knife blade as set forth in claim 1 wherein the opposite faces of the blade converge toward the flanks.

References Cited

UNITED STATES PATENTS

| | | | |
|---|---|---|---|
| 601,343 | 3/1898 | Johnson | 143—133 |
| 1,497,577 | 6/1924 | Morzsa | 145—31 |
| 1,819,623 | 8/1931 | Rocklin | 30—355 |
| 2,059,414 | 11/1936 | Taylor | 30—355 |
| 2,825,968 | 3/1958 | Baer | 30—355 |

ROBERT C. RIORDON, Primary Examiner

J. C. PETERS, Assistant Examiner